(12) United States Patent
Conboy et al.

(10) Patent No.: US 8,395,483 B2
(45) Date of Patent: Mar. 12, 2013

(54) POWER CONTROLLER FOR AN ELECTRONIC READER DEVICE

(76) Inventors: Garth Conboy, La Jolla, CA (US);
Mark Foster, Palo Alto, CA (US);
Vincent Le Chevalier, San Jose, CA (US); John Rivlin, Palo Alto, CA (US);
Khin Zaw, Cupertino, CA (US)

( * ) Notice: Subject to any disclaimer, the term of this patent is extended or adjusted under 35 U.S.C. 154(b) by 484 days.

(21) Appl. No.: 12/574,721

(22) Filed: Oct. 7, 2009

(65) Prior Publication Data
US 2011/0080266 A1 Apr. 7, 2011

(51) Int. Cl.
*H04Q 5/22* (2006.01)
*G08B 13/14* (2006.01)
*H04M 1/00* (2006.01)

(52) U.S. Cl. .................. 340/10.34; 340/10.3; 340/10.1; 340/572.1; 340/539.3; 455/574; 455/127.1; 455/420

(58) Field of Classification Search .................. 713/330, 713/300, 324, 323, 310, 401; 340/10.3, 10.34; 323/303, 299, 301, 222; 364/492; 395/441; 711/114, 162
See application file for complete search history.

(56) References Cited

U.S. PATENT DOCUMENTS

| | | | |
|---|---|---|---|
| 5,848,281 A * | 12/1998 | Smalley et al. | 713/322 |
| 6,983,384 B2 * | 1/2006 | Iwaki | 713/300 |
| 7,114,090 B2 * | 9/2006 | Kardach et al. | 713/323 |
| 7,171,571 B2 * | 1/2007 | Starr et al. | 713/320 |
| 7,206,951 B2 * | 4/2007 | Ishibashi et al. | 713/323 |
| 7,581,137 B2 * | 8/2009 | Okada et al. | 714/24 |
| 7,804,435 B2 * | 9/2010 | Sadowski et al. | 341/155 |
| 7,893,834 B2 * | 2/2011 | Park et al. | 340/572.1 |
| 2008/0231449 A1 * | 9/2008 | Moshfeghi | 340/572.1 |
| 2009/0259863 A1 * | 10/2009 | Williams et al. | 713/323 |
| 2011/0083029 A1 * | 4/2011 | Tupa et al. | 713/324 |

* cited by examiner

*Primary Examiner* — Daniel Wu
*Assistant Examiner* — Mancil Littlejohn
(74) *Attorney, Agent, or Firm* — Hunton & Williams LLP

(57) ABSTRACT

A system and method for controlling the power of an electronic reader device is provided. The system for controlling the power of an electronic reader device may comprise a computing apparatus that may receive a command from a host system to change the power state a power controller. The system may also comprise a computing apparatus that may adjust the power state of the power controller by using one or more registers. The system may further comprise a computing apparatus that may adjust the power of one or more power supplies. The system may additionally comprise a computing apparatus that may instruct a display controller to perform an operation based on the change of the power state of the power controller.

6 Claims, 4 Drawing Sheets

POWER CONTROLLER FOR AN ELECTRONIC READER DEVICE

FIELD OF THE INVENTION

The present invention generally relates to a system and method for controlling the power of an electronic reader device.

BRIEF DESCRIPTION OF THE DRAWINGS

The present invention, together with further objects and advantages, may best be understood by reference to the following description taken in conjunction with the accompanying drawings, in the several figures of which like reference numerals identify like elements, and in which.

DETAILED DESCRIPTION OF EMBODIMENTS

Certain embodiments of the present invention provide a power controller for an electronic reader device. The power controller may be used to increase the power efficiency of the electronic reader device. Through the use of a power controller, the electronic reader device may manage power consumption more efficiently and improve the battery life of the electronic reader device. An added benefit from the power controller may be that the electronic reader device may be used for a longer period of time without having to recharge. Even when the device is charging, the power controller may permit more efficient power consumption and power management. The power controller may control the power of the electronic reader device without jeopardizing the functionality of the device.

Traditional electronic reader devices present engineering issues associated with power consumption. Traditional electronic reader devices generally fail to include a controller focused on controlling and managing the power of the device. A main processing unit and other processors of traditional electronic reader devices are left with the task of managing the power. This requires the main processing unit and the other processors to draw additional voltage and current while managing the power in addition to their normal functions. Another engineering issue arises due to response times. The main processor and other processors of traditional electronic reader devices respond slowly to changes in the power state of the device. For example, when traditional electronic reader devices receive a command to change from a standby mode to a fully on mode, the main processor must, in addition to its other functions, enable the display controller in order to turn on the display of the electronic reader device. The burden on the main processor causes an increase in power consumption and delays in the reaction time of the display.

These and other engineering challenges create a need for a power controller that can meet the unique needs of an electronic reader device. There is a need for a power controller that can relieve the main processor and other processors from worrying about managing and controlling the power of an electronic reader device.

Figure 1:
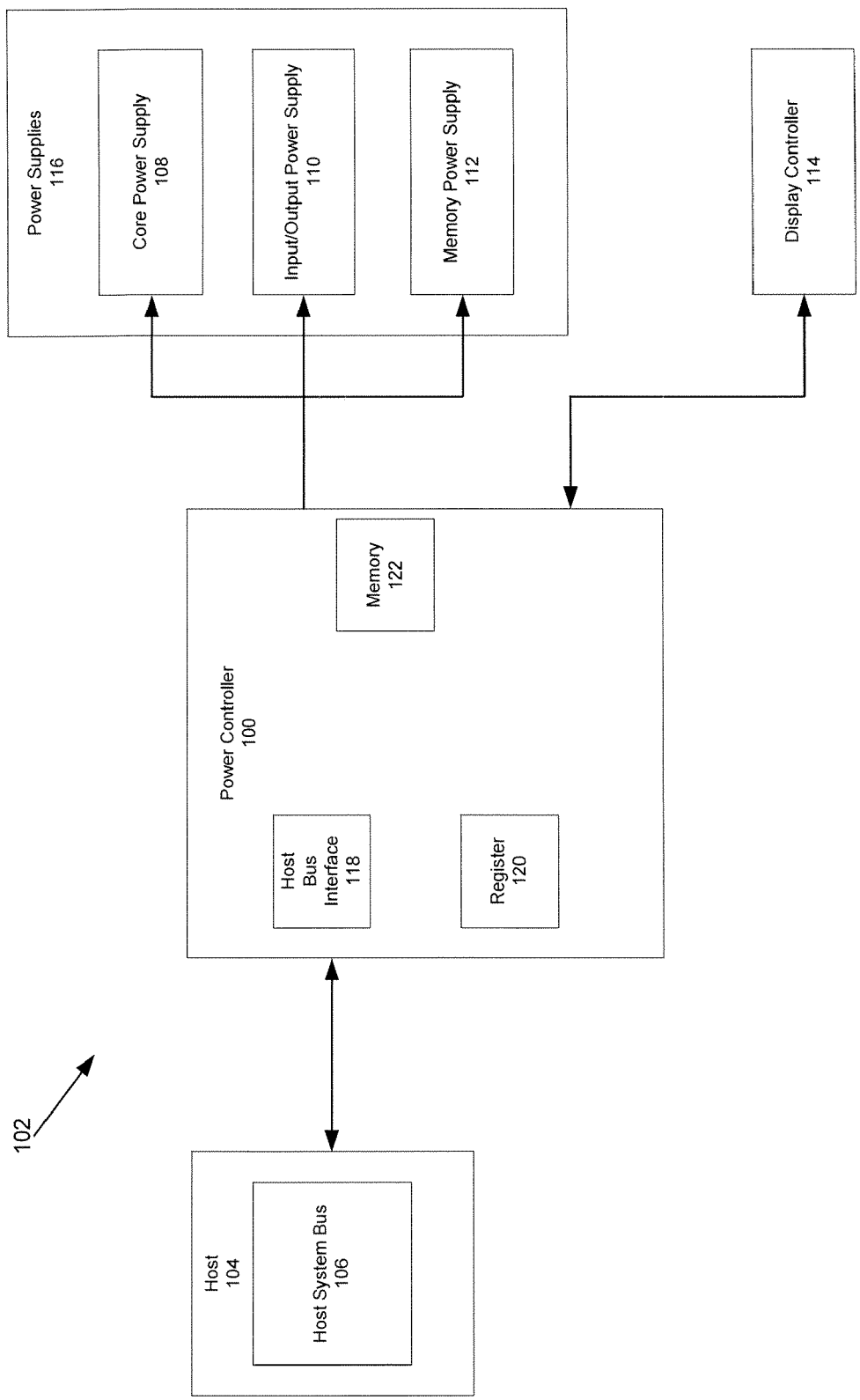
FIG. 1 is a schematic diagram of a power controller in an electronic reader device according to an embodiment of the present invention.

FIG. 1 is a schematic diagram of a power controller 100 in an electronic reader device 102 according to an embodiment of the present invention. The power controller 100 may be implemented on, by way of non-limiting example, an ASIC, a field programmable gate array ("FPGA"), a complex programmable logic device ("CPLD") or a dedicated integrated circuit. The embodiment illustrated in FIG. 1 may be installed in an electronic reader device 102 or any other device that includes or directs a power controller 100.

FIG. 1 also illustrates the communication that may occur between the power controller 100, a host 104, one or more power supplies 116 and/or a display controller 114. This communication may occur by using electrical signals that are transmitted and/or received by the power controller 100, host 104, one or more power supplies 116 and display controller 114. For example, the host 104 may transmit an electrical signal to the power controller 100 instructing the power controller 100 to change its power state. General input/output operations may be used to facilitate the communication between the power controller 100, host 104, one or more power supplies 116 and/or the display controller 114. The communication between the power controller 100, the host 104, one or more power supplies 116 and/or the display controller 114 may be used to control the power state of the power controller 100 and/or the electronic reader device 102.

The power controller 100 may have logic that controls the power state of the power controller 100 and/or the electronic reader device 102. In some embodiments, the power controller 100 may have one or more power states. The power states of the power controller 100 may be on, off, sleep or deep sleep. The power state of the power controller 100 may be used to determine the power state of the electronic reader device 102. The power state of the power controller 100 may have an effect on the host 104, host bus interface 118, one or more registers 120, memory 122, the one or more power supplies 116 and/or the display controller 114. The power state of the power controller 100 may be independent of the power state of the host 104 and/or main processor or central processing unit of the electronic reader device 102.

The power controller 100 may be coupled to the host 104. In general, the power controller 100 may receive instructions or commands from the host 104. The instructions or commands may determine the power state of the power controller 100 and/or the electronic reader device 102. The power controller 100 may include a host bus interface 118. The host bus interface 118 may communicate with a host system bus 106. The host bus interface 118 may communicate with the host system bus 106 using the host's data flash interface. By way of non-limiting example, the host system bus 106 may be an addressable bus with shared address and data input/output capabilities. The data flash interface may utilize a variable length input/output ("VLIO") running a low order addressing mode. The power controller 100 may use a ready pin to inform the host 104 that it is ready for the next transmission. An exemplary host and/or host interface may be manufactured by Marvell Semiconductor, Inc. of Santa Clara, Calif. In some embodiments, the host 104 may be the main processor or central processing unit of the electronic reader device 102.

The power controller 100 may have one or more registers 120. The one or more registers 120 of the power controller 100 may be used to indicate the power state of the power controller 100. The one or more registers 120 may be two bit registers. In some embodiment, there may be two registers. Each register may have two bits that represent one of four power states (i.e. on, off, sleep, and deep sleep). The one or more registers 120 may have a register clock. In some embodiments, the register clock may be a power state register clock.

The power controller 100 may be coupled to memory 122. In some embodiments, the memory 122 may be external from the power controller 100. The power controller 100 may be coupled to the memory 122 via a memory interface, such as Double Data Rate (DDR) SDRAM interface. The memory 122 may be any kind or type of memory. The memory 122 may be, by way of non-limited example, DDR memory and/or an SDRAM integrated circuit.

The one or more power supplies 116 may include a core power supply 108, a input/output power supply 110, and a memory power supply 112. The one or more power supplies 116 may supply power to the power controller 100 and/or the electronic reader device 102. The one or more power supplies 116 may provide power to different parts of the power controller 100. The one or more power supplies 116 may be coupled to the power controller 100. In some embodiments, the one or more power supplies 116 may be external to the power controller 100. The one or more power supplies 116 may provide power to components external to the power controller 100.

The core power supply 108 may supply the main power to the power controller 100. The power state of the core power supply 108 may adjust based on the power state of the power controller 100. The input/output power supply 110 may supply the power that allows the power controller 100 to interact with the host 104, one or more power supplies 116 and/or the display controller 114. In some embodiments, the input/output power supply 110 may supply the power that allows the power controller 100 to interact with the core power supply 108 and/or the memory power supply 112. The power state of the input/output power supply 110 may adjust based on the power state of the power controller 100. The memory power supply 112 may supply power to memory 122 of the power controller 100. The memory power supply 112 may be used to help save, retain or lock certain content on the electronic reader device 102. The power state of the memory power supply 112 may adjust based on the power state of the power controller 100.

The display controller 114 may be used to control the display of the electronic reader device 102. In some embodiments, the display controller 114 may be used to control an electronic paper display (referred to as "EPD"). The display controller 114 may control EPD's such as electrophoretic displays or electro-wetting displays. Examples of such displays include those disclosed in U.S. Pat. Nos. 6,577,433, 6,529,313, 6,525,866, 6,574,034, 6,017,584, 6,067,185, 6,118,426, 6,120,839, 6,124,851, 6,130,774, 6,172,798, 6,177,921, 6,232,950 and 6,249,271.

An exemplary such electronic panel display and electronic display controller 114 is disclosed in U.S. patent application Ser. No. 12/497,199 entitled "Electronic Display Controller", filed on Jul. 2, 2009, the contents of which are hereby incorporated by reference. In some embodiments of the present invention, the use of the EPD and the power controller 100 may give off the appearance that the electronic reader device 102 is always on.

Figure 2:
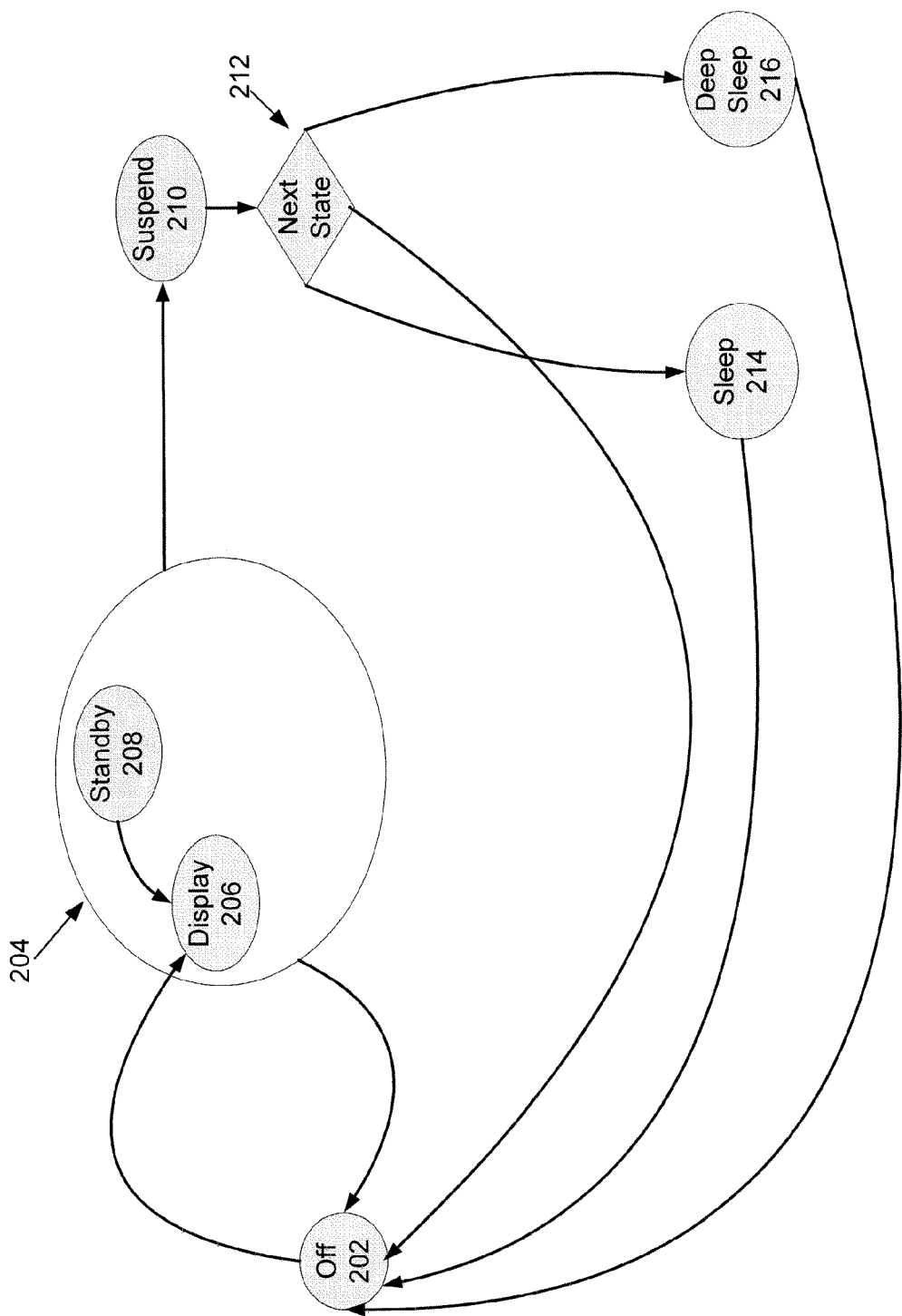
FIG. 2 is a state diagram of a power controller according to an embodiment of the present invention.

FIG. 2 is a state diagram of a power controller 100 according to an embodiment of the present invention. Certain embodiments of FIG. 2 illustrate the power states of the power controller 100. The power controller 100 may have multiple power states. In some embodiments, the power controller may have an off 202, on 204, sleep 214 and deep sleep 216 power state.

The power controller 100 may transition from the off power state 202 to the on power state 204. Generally, when the power controller 100 is in the off power state 202 the power controller 100 may transition to the on power state 204. The power controller 100 may also transition from the on power state 204 to the off power state 202, sleep power state 214, or deep sleep power state 216. The power controller may transition from the sleep power state 214 to the on power state 204 or the off power state 202. The power controller 100 may transition from the deep sleep power state 216 to the on power state 204 or the off power state 202. To transition to or from a power state, the power controller 100, host 104, one or more power supplies 116 and/or the display controller 114 may communicate with each other.

In the on power state 204, the power controller 100 may be performing an operation, waiting for a command, or planning to transition to another power state. In the on power state 204, the electronic reader device 102 is being actively used. When the power controller 100 is in the on power state 204, the power controller 100 may be in an operational mode. The power controller 100 may be in a display mode 206 or a standby mode 208. The display mode 206 may occur when the power controller 100 receives a command. For example, the power controller 100 may be actively receiving commands from the host 104. In the display mode 206, the power controller 100 may be fully operational. The display mode 206 may also occur when the power controller 100 is updating the display controller 114 and/or an EPD. For example, a user of the electronic reader device 102 may flip a page of an electronic book. The action of flipping a page may require the power controller 100 to communicate with the display controller 114 in order to change the display on the electronic reader device 102. The standby mode 208 may occur when the power controller 100 is pending an operation. In standby mode 208, the power controller 100 may be waiting for an instruction, command and/or image data. In the standby mode 208, a clock of the power controller 100 and/or the clock of the one or more registers 120 may be running at normal speed.

The suspend mode 210 may occur when the power controller 100 is transitioning to another power state. For example, the suspend mode 210 may occur when the power controller is transitioning to the sleep power state 214 or deep sleep power state 216. In some embodiments, the suspend mode 210 may transition to a next state 212 prior to transitioning to the sleep power state 214 or deep sleep power state 216. In suspend mode 210, a clock of the power controller 100 and/or the clock of the one or more registers 120 may be prepared to be stopped or may be stopped. In the suspend mode 210, the power controller 100 may draw the lowest power. For example, the power controller 100 may draw 15-20 mA in suspend mode 210. In some embodiments, the power controller 100 may transfer directly from the on power state 204 to the next state 212.

The power state of the power controller 100 may determine the power state of the one or more power supplies 116. For example, power rails of the one or more power supplies 116 may be turned off and on based on the power state of the power controller 100. When the power controller 100 is in the off power state 202, the core power supply 108, the input/output power supply 110, and the memory power supply 112 may be in the off state. When the power controller 100 is in the deep sleep state 216, the core power supply 108 and the input/output power supply 110 may be in the off state, and the memory power supply 112 may be in the on state. In the deep sleep power state 216, the memory 122 may be on. The memory 122 may be placed in a partial mode. The memory 122 may store or maintain the content of the electronic reader device 102. For example, the memory 122 may store all of the settings related to the electronic reader device 102. Maintaining the content of the electronic reader device 102 may help prevent the loss of important content while the device 102 is not in use.

When the power controller 100 is in the sleep power state 214, the input/output power supply 110 may be in the off state, and the core power supply 108 and the memory power supply 112 may be in the on state. In the sleep power state 214, the memory 122 may be on. In the sleep power state 214, the electronic reader device 102 may have a fast ability to transition to the on power state 204. For example, by leaving the core power supply 108 on, the electronic reader device 102 may turn on almost instantaneously when the power controller 100 transitions to an on power state 204. The electronic reader device 102 may turn on more quickly when transition from the sleep power state 214 than the deep sleep power state 216. In some embodiments, in the sleep power state 214, the display controller 114 may not require initialization and may load quickly. When the power controller 100 is in the on power state 204, the core power supply 108, the input/output power supply 110, and the memory power supply 112 may be in the on state. In the on power state 204, all components of the power controller 100 may be on.

The table below illustrates the relation between the power state of the power controller 100 and the power state of the core power supply 108, the input/output power supply 110 and the memory power supply 112.

| Power State of Power Controller | Core Power Supply | Input/Output Power Supply | Memory Power Supply |
| --- | --- | --- | --- |
| Off(00) | Off | Off | Off |
| Deep sleep(01) | Off | Off | On |
| Sleep(10) | On | Off | On |
| ON(11) | On | On | On |

In some embodiments, the power state of the power controller 100 may be represented by one or more bits. The one or more registers 120 of the power controller may indicate the power state of the power controller 100. In some embodiment, there may be two registers that have two bits. Each register may have one or more bits that represent the off 202, on 204, sleep 214 and deep sleep 216 power states. For example, bits 00 may represent the off power state 202, bits 11 may represent the on power state 204, bits 10 may represent the sleep power state 214, and bits 01 may represent the deep sleep power state 216.

The one or more registers 120 of the power controller 100 may represent a current or present state of the power controller 100 or a delayed or next state 212 of the power controller 100. In some embodiments, one of the one or more registers 120 may represent the current or present state of the power controller 100. Another of the one or more registers 120 may represent the delayed or next state 212 of the power controller 100. The current or present state may be used to require an immediate change to the power state of the power controller 100. In some embodiments, the current or present state of the power controller may be the on power state 204 or the off power state 202. The delayed or next state 212 may be used to require a delayed change to the power state of the power controller 100. The delayed or next state 212 may cause the power controller 100 to wait for a certain event prior to changing the power state of the power controller 100. The next state 212 may generally occur when the power controller 100 is in the on power state 204. In some embodiments, the next state 212 may occur when the power controller 100 is transitioning from the on power state 204 to another power state.

Figure 3:
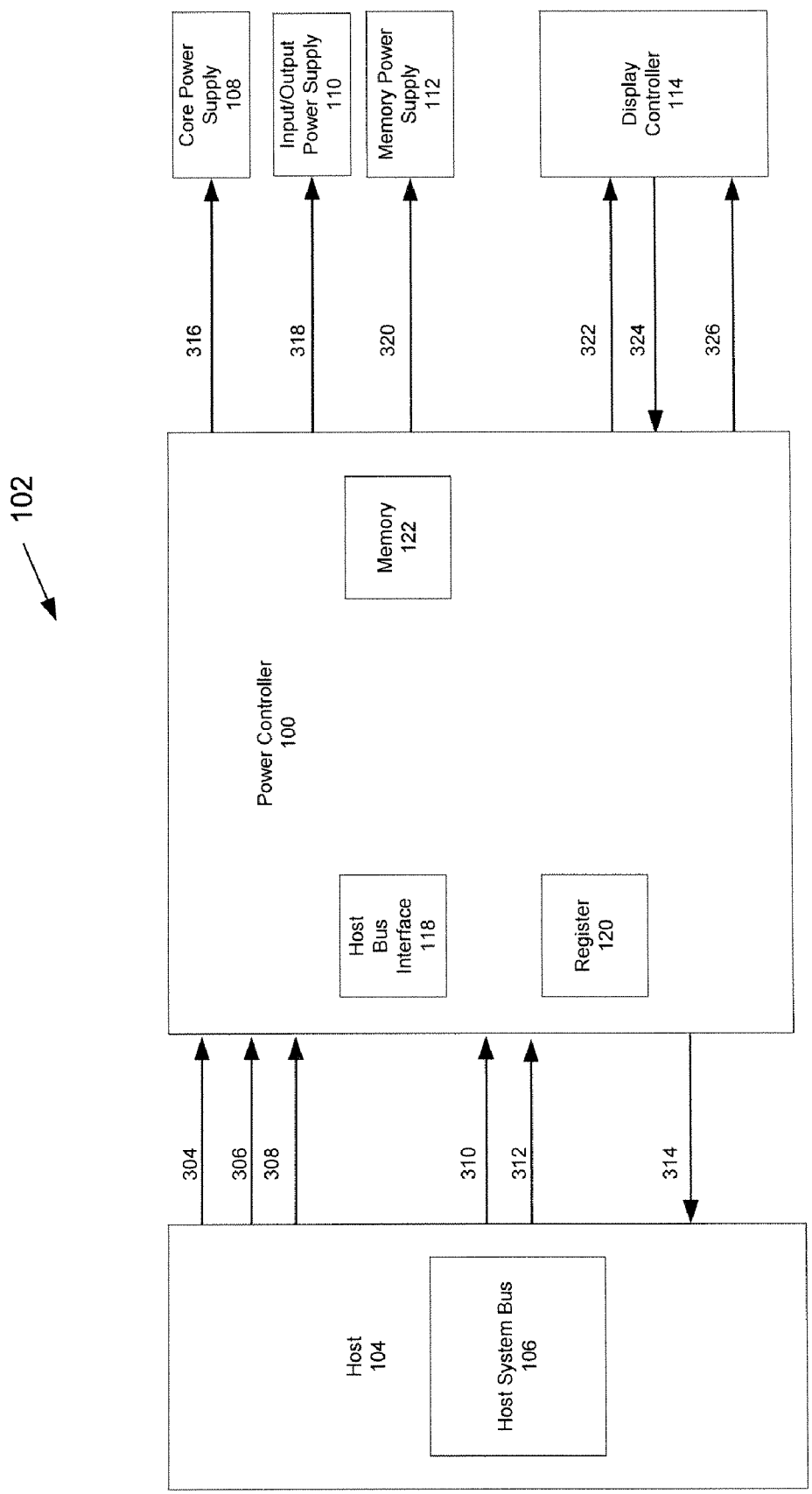
FIG. 3 is a schematic diagram of a power controller in an electronic reader device according to an embodiment of the present invention.

FIG. 3 is a detailed schematic diagram of a power controller 100 in an electronic reader device 102 according to an embodiment of the present invention. FIG. 3 illustrates the electrical signals communicated between the power controller 100, host 104, one or more power supplies 116 and/or a display controller 114. The signals communicated between the power controller 100, host 104, one or more power supplies 116 and/or the display controller 114 may be one or more power state signals 304, one or more register signals 306, one or more clock signals 308, a host reset signal 310, an enable display signal 312, one or more power status signals 314, a core power signal 316, an input/output power signal 318, a memory power signal 320, a suspend power mode signal 322, a suspend clock signal 324, and one or more display control signals 326. All or some of the signals may be communicated between the power controller 100 and the host 104 using the host bus system 106 and the host bus interface 118.

The power state of the power controller 100 may be changed based on the content of all or some of the signals. In some embodiments, the signals communicated between the power controller 100 and the host 104 or main processing unit of the electronic reader device 102 may be the one or more power state signals 304, the one or more register signals 306, the one or more clock signals 308, the host reset signal 310, the enable display signal 312, and the one or more power status signals 314.

The one or more power state signals 304 may be communicate to the power controller 100. The one or more power state signals 304 may provide instructions or commands that may indicate a change of the power state of the power controller 100. In some embodiments, the instructions or commands may be to change the power state of the power controller 100. For example, the one or more power state signals 304 may instruct the power controller 100 to change from an on power state 204 to a sleep power state 214. The one or more power state signals 304 may be named PWR_STATE_D0 and PWR_STATE_D1. In some embodiments, the one or more power state signals 304 may provide instructions or commands for the one or more registers 120 of the power controller 100 to control the power of the power controller 100. The one or more power state signals 304 may be communicated by the host 104 to the power controller 100.

The one or more register signals 306 may be communicated to the power controller 100. The one or more register signals 306 may be used to determine the power state of the power controller 100 and/or electronic reader device 102. The one or more register signals 306 may be provided to the one or more registers 120 of the power controller 100. In some embodiments, the content of one or more register signals 306 may include one or more bits for each of the one or more registers 120. The one or more bits may represent a power state of the power controller 100. For example, one register signal may include the bits 11 for a register that represents the current state of the power controller and another register signal may include the bits 10 for another register that represents the next state of the power controller. The one or more register signals 306 may be named PWR_STATE_REGSEL.

The one or more clock signals 308 may be communicated to a clock of the power controller 100 and/or the clock of the one or more registers 120. The communication of the one or more clock signals 308 may be dependent upon the communication of the one or more register signals 306. The one or more clock signals 308 may be used to turn on or off a clock of the power controller 100 and/or the clock of the one or more registers 120. The one or more clock signals 308 may also be used to prepare a clock of the power controller 100 and/or the clock of the one or more registers 120 to turn on or off. In some embodiments, the one or more clock signals 308 may include one or more bits that determine whether to turn on or off the a clock of the power controller 100 and/or the clock of the one or more registers 120. For example, the bit 0 may mean that the clock may be turned off or disable, the bit 1 may mean that the clock may be turned on or enabled. The one or more clock signals 308 may be named NEWP-WR_STATE_CLK.

The host reset signal 310 may be communicated from the host 104 to the power controller 100. The host reset signal 310 may be communicated from the host 104 to the power controller 100 during a reset process of the host 104, the power controller 100 and/or display controller 114. In some embodiments, the reset process may be a hard reset of the entire electronic reader device 102. The hard reset process may reset the display controller 114. The hard reset process may reset the host 104. In some embodiments, the hard reset process may be used to only reset the power controller 100. The hard reset process may occur as part of the security scheme of the electronic reader device 102. The host reset signal 310 may be named GBY_RST_C_GPIO.

The enable display signal 312 may be used to enable or disable the display controller 114. The enable display signal 312 may be received from the host 104. The enable display signal 312 may include a bit that determines whether to enable or disable the display controller 114. For example, when the bit is 0 the display controller 114 may be disabled and when the bit is 1 the display controller 114 may be enabled. The enable display signal 312 may be named GBY_EN_C_GPIO.

The one or more power status signals 314 may communicate the power state of the power controller to the host 104. The one or more power status signals 314 may be communicated from the power controller 100 to the host 104. The one or more power status signals 314 may provide the host 104 with an update on the power status of the power controller 100. For example, the one or more power status signals 314 may inform the host 104 that the power controller 100 is in one of multiple power states (i.e. on, off, sleep, or deep sleep). In some embodiments, the power controller 100 may provide the one or more power status signals 314 in response to a request from the host 104 regarding the power status of the power controller 100. In some embodiments, the one or more power status signals 314 may be named PWR_STATUS.

The power controller 100 and one or more power supplies 116 may communicate through one or more power signals. In some embodiments, the signals communicated between the power controller 100 and the one or more power supplies 116 are the core power signal 316, the input/output power signal 318, and the memory power signal 320. The one or more power signals communicated between the power controller 100 and the one or more power supplies 116 may change the power state of the one or more power supplies 116. For example, the core power signals 316 communicated from the power controller 100 to the core power supply 108 may change the power state of the core power supply 108 by turning off a power rail to the core power supply 108.

The power controller 100 and the core power supply 108 may communicate through the core power signal 316. The core power signal 316 may be used to change the power state of the core power supply 108. For example, to turn on the core power supply 108 the power controller 100 may provide a core power signal 316. The core power signal 316 may include a bit such as 1 or may include a statement such as true to turn on the core power supply 108. The core power signal 316 may include a bit such as 0 or a statement such as false to turn off the core power supply 108. The core power signal 316 may be named EPD_PWR_EN_G. The power controller 100 and the input/output power supply 110 may communicate through the input/output power signal 318. The input/output power signal 318 may be used to change the power state of the input/output power supply 110. The input/output power signal 318 may be named VTT_EN_G. The power controller 100 and the memory power supply 112 may communicate through the memory power signal 320. The memory power signal 320 may be used to change the power state of the memory power supply 112. The memory power signal 320 may be named GBY_MEM_PWR_EN_G The suspend power mode signals 322 be communicated between the power controller 100 and the display controller 114. The suspend power mode signals 322 may be used to send the power controller 100 into suspend mode 210. The suspend power mode signals 322 may also be used to indicate that the power controller 100 is in or entering suspend mode 210. The suspend power mode signals 322 may also be used to change the power state of the display controller 114. For example, the suspend power mode signals 322 may cause the display controller 114 to enter a suspend mode 210. The suspend power mode signal 322 may also be used to instruct the display controller 114 to perform certain operations on the display of the electronic reader device 102.

The suspend clock signal 324 may be communicated between the power controller 100 and the display controller 114. The suspend clock signal 324 may be closely correlated with the suspend power mode signals 322. The suspend clock signals 324 may stop a clock of the power controller 100 when the power controller 100 enters suspend mode 210. The suspend clock signal 324 may indicate that the clock of the power controller 100 may be ready to be stopped before entering suspend mode 210. The suspend clock signal 324 may also be used to stop or prepare to stop a clock of the display controller 114.

The one or more display control signals 326 may be communicated between the power controller 100 and the display controller 114. The one or more display control signals 326 may be used to control a display controller 114. The one or more display control signals 326 may communicate instructions or commands to the display controller 114. For example, the one or more display control signals 326 may indicate that the power state of the power controller 100 is on and the display controller 114 should turn on. The one or more display control signals 326 may also communicate signals that may be used to enable, disable or reset the display controller 114.

Figure 4:
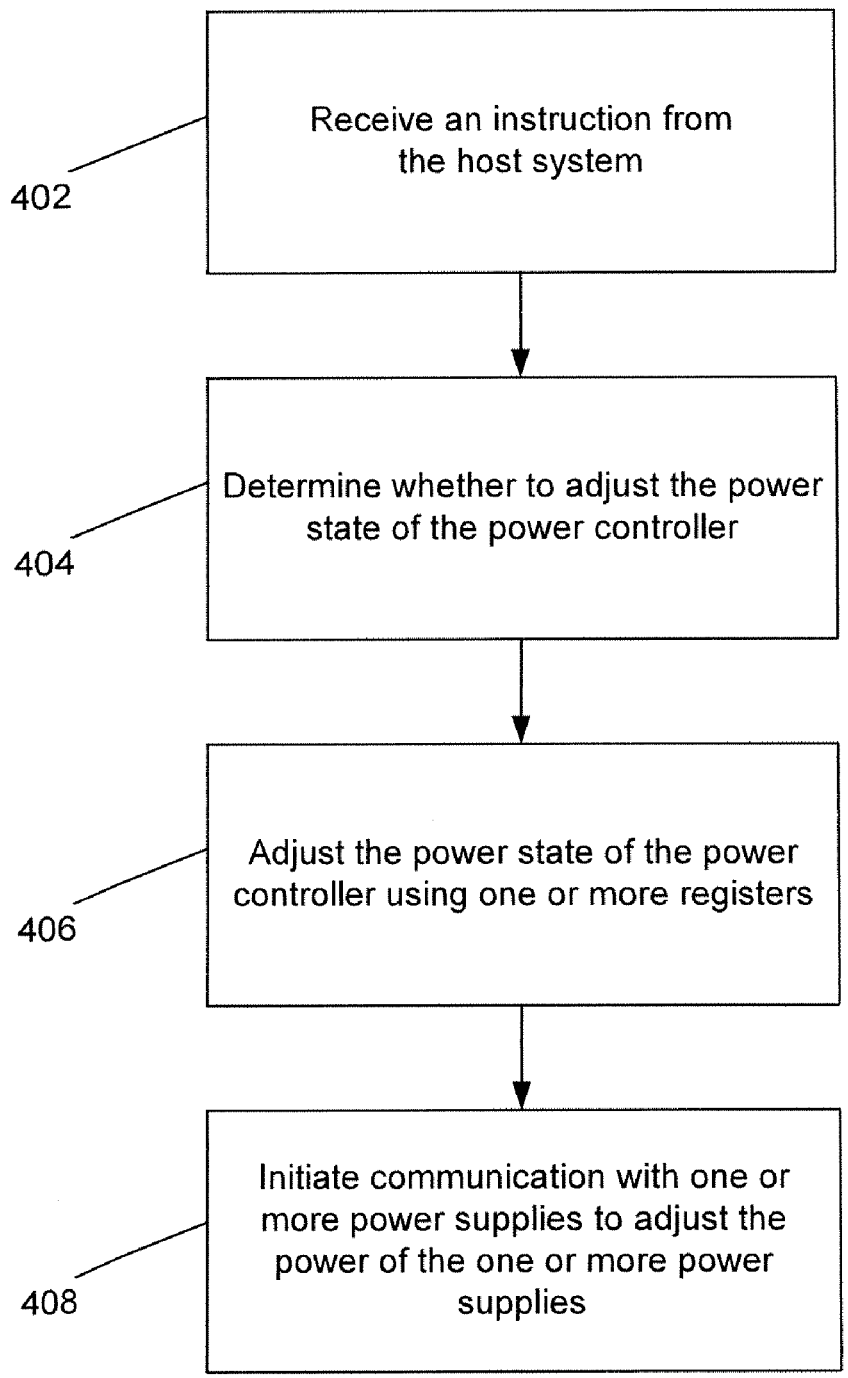
FIG. 4 is a flowchart of a method for controlling the power of an electronic reader device according to an embodiment of the present invention.

FIG. 4 illustrates a flowchart of a method for controlling the power of an electronic reader device according to an embodiment of the present invention. At block 402, the power controller 100 receives a command or instruction from the host 104. The command or instruction may be to change the power state of the power controller 100. At block 404, the power controller 100 determines whether to adjust the power state based on the command. The power controller 100 may evaluate the command and determine whether the command requires a change of its power state. The command may be correlated with an action of the electronic reader device 102. For example, the user of the electronic reader device 102 may press a button or enter a command on the device 102 and that command may be transferred from the host 104 to the power controller 100.

At block 406, the power state of the power controller 100 may be adjusted by using one or more registers 120. The one or more registers 120 may help determine the power state of the power controller. One or more bits of the one or more registers 120 may be changed to adjust the power state of the power controller 100. The one or more bits of the one or more registers 120 may dictate the power state of the power controller 100. At block 408, communication may be initiated with the one or more power supplies 116 to adjust the power of the one or more power supplies 116. The power controller 100 may communicate with the one or more power supplies 116 to adjust the power of the one or more power supplies 116 based on the power state of the power controller 100. For example, when the power controller 100 is in the sleep power state 214, the power controller 100 may communicate to the input/output power supply 110 that it should turn off.

It will be readily understood by those persons skilled in the art that the present invention is susceptible to broad utility and application. Many embodiments and adaptations of the present invention other than those herein described, as well as many variations, modifications and equivalent arrangements, will be apparent from or reasonably suggested by the present invention and foregoing description thereof, without departing from the substance or scope of the invention.

While the foregoing illustrates and describes exemplary embodiments of this invention, it is to be understood that the invention is not limited to the construction disclosed herein. The invention can be embodied in other specific forms without departing from its spirit or essential attributes.

We claim:

1. An electronic reader device comprising:
   a host that provides a power adjustment command that indicates one of at least three power states for the power controller;
   a power controller that receives the power adjustment command from the host, the power controller comprising at least one register, the register comprising at least two bits that identify the power state of the power controller;
   at least one power supply controlled by the power controller comprising a core power supply, an input/output power supply and a memory power supply; and
   a display controller that performs an operation based on the power state of the power controller;
   wherein at least one of:
   (1) when the power controller is in the on power state, the bits of the register are adjusted to 11 and the core power supply, the input/output power supply and memory power supply are adjusted to an on power;
   (2) when the power controller is in the deep sleep power state, the bits of the registers are adjusted to 01 and the core power supply and the input/output power supply are adjusted to an off power state;
   (3) when the power controller is in the sleep power state, the bits of the register are adjusted to 10 and the input/output power supply is adjusted to an off power state and the core power supply and the memory power supply are adjusted to an on power state; and
   (4) when the power controller is in the off power state, the bits of the register are adjusted to 00; and the core power supply, the input/output power supply and memory power supply are adjusted to an off power state.

2. The system of claim 1 wherein the power controller communicates the state of the power controller to the host.

3. The system of claim 1, wherein the power controller enables or disables the display controller based on the power state of the power controller.

4. A hardware implemented method for controlling the power of an electronic reader device, the method comprising:
   receiving, at a power controller for the electronic reader device, a power adjustment command from a host, the power adjustment command indicating one of at least three power states for the power controller;
   determining, by the power controller, whether to adjust the power state of the power controller based on the power adjustment command, the power adjustment command correlated with an action of the electronic reader device; and
   adjusting, by the power controller, the power state of the power controller by adjusting one or more bits in at least one register
   Wherein at least one of:
   (1) when the power controller is in the on power state, the bits of the register are adjusted to 11 and a control signal is sent to adjust a core power supply, an input/output power supply and a memory power supply to an on power state;
   (2) when the power controller is in the deep sleep power state, the bits of the register are adjusted to 01 and a control signal is sent to adjust the core power supply and the input/output power supply to an off power state;
   (3) when the power controller is in the sleep power state, bits of the register are adjusted to 10 and a control signal is sent to adjust the input/output power supply to an off power state and the core power supply and the memory power supply to an on power state; and
   (4) when the power controller is in the off power state, the bits of one of the register are adjusted to 00, and a control signal is sent to adjust the core power supply, the input/output power supply and the memory power supply are adjusted to an off power state.

5. The method of claim 4, further comprising, prior to receiving the power adjustment command, determining the power state of the power controller.

6. A hardware implemented method for controlling the power of an electronic reader device, the method comprising:
   receiving, at a power controller for the electronic reader device, a power adjustment command from a host, comprising at least one register, the register comprising at least two bits that identify the power state of the power controller, the power adjustment command indicating one of at least three power states for the electronic reader device;
   determining, by the power controller, whether to adjust the power state of a power controller based on the power adjustment command, the power adjustment command indicating an action of the electronic reader device;
   adjusting, by the power controller, the power state of the power controller by using the register; and
   sending, by the power controller, a control signal to the display controller to perform an operation based on the change in power state of the power controller;
   wherein at least one of:
   (1) when the power controller is in the on power state, the bits of the register are adjusted to 11 and a control signal is sent to adjust a core power supply, an input/output power supply and a memory power supply to an on power state;
   (2) when the power controller is in the deep sleep power state, the bits of the register are adjusted to 01 and a control signal is sent to adjust the core power supply and the input/output power supply to an off power state;
   (3) when the power controller is in the sleep power state, bits of the register are adjusted to 10 and a control signal is sent to adjust the input/output power supply to an off power state and the core power supply and the memory power supply to an on power state; and (4) when the power controller is in the off power state, the bits of one of the register are adjusted to 00, and a control signal is sent to adjust the core power supply, the input/output power supply and the memory power supply are adjusted to an off power state.

\* \* \* \* \*